United States Patent
Tonyes et al.

(10) Patent No.: US 8,277,864 B2
(45) Date of Patent: Oct. 2, 2012

(54) LIQUID COFFEE CONCENTRATES AND METHODS OF MAKING THEREOF

(75) Inventors: Henry Tonyes, Hopewell Junction, NY (US); Annesa Seemungal, Ossining, NY (US); David Bresnahan, Mason City, IA (US); Richard DeSanto, Irvington, NY (US)

(73) Assignee: Kraft Foods Global Brands LLC, Northfield, IL (US)

( * ) Notice: Subject to any disclaimer, the term of this patent is extended or adjusted under 35 U.S.C. 154(b) by 277 days.

(21) Appl. No.: 12/482,168

(22) Filed: Jun. 10, 2009

(65) Prior Publication Data
US 2010/0316784 A1 Dec. 16, 2010

(51) Int. Cl.
*A23F 5/00* (2006.01)
(52) U.S. Cl. ............ 426/594; 426/330.3; 426/431; 426/432; 426/520
(58) Field of Classification Search ............ 426/570, 426/580, 330.3, 431, 432, 520, 594
See application file for complete search history.

(56) References Cited

U.S. PATENT DOCUMENTS

| | | | |
|---|---|---|---|
| 4,378,380 A * | 3/1983 | Scarpellino et al. | 426/533 |
| 4,983,408 A | 1/1991 | Colton | |
| 5,455,057 A | 10/1995 | Symbolik et al. | |
| 5,993,877 A | 11/1999 | Ohtake | |
| 6,054,162 A | 4/2000 | Bradbury et al. | |
| 6,352,736 B2 | 3/2002 | Borland et al. | |
| 6,399,131 B2 | 6/2002 | Zeller et al. | |
| 6,428,833 B1 | 8/2002 | Suwelack et al. | |
| 6,979,472 B2 | 12/2005 | Apiscopa et al. | |
| 2002/0164410 A1 | 11/2002 | Ogden et al. | |
| 2005/0129828 A1* | 6/2005 | Dria et al. | 426/594 |
| 2008/0160151 A1 | 7/2008 | Zeller et al. | |
| 2011/0027436 A1* | 2/2011 | Huynh-Ba et al. | 426/330.3 |

* cited by examiner

*Primary Examiner* — D. Lawrence Tarazano
*Assistant Examiner* — Tamra L Dicus
(74) *Attorney, Agent, or Firm* — Fitch, Even, Tabin & Flannery, LLP

(57) ABSTRACT

Methods for stabilizing liquid coffee concentrates are provided that form a coffee beverage that has a substantially consistent acidity profile. In one aspect, the methods blend a liquid coffee concentrate base with an edible alkali source in an amount effective to artificially increase a pH of the liquid coffee concentrate base. The liquid coffee concentrate base is aseptically processed and thermally treated at elevated temperatures for a time sufficient to artificially drive acid generating reactions in the liquid coffee concentrate to completion to form a stabilized liquid coffee concentrate.

9 Claims, 1 Drawing Sheet

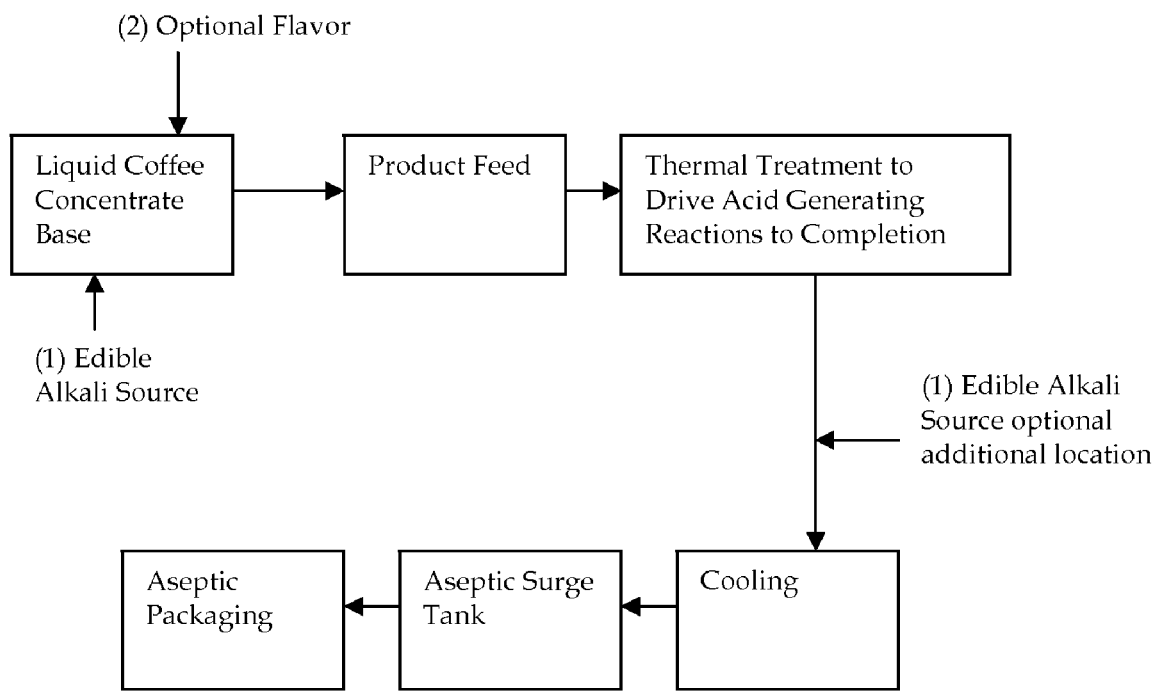

LIQUID COFFEE CONCENTRATES AND METHODS OF MAKING THEREOF

FIELD

The field relates to liquid coffee and, more particularly, to methods of improving the stability of liquid coffee concentrates.

BACKGROUND

Factors that determine the quality of liquid coffee and liquid coffee concentrates may be its acidity and/or level of sulfur containing compounds. The effect acids, acidity, and sulfur levels have on the organoleptic characteristics of a cup of coffee can, in many cases, be determining factors in the consumer appeal of a coffee beverage. For example, too much acidity in a coffee can result in an undesirable sourness to the beverage, while too little acidity in the coffee may cause a flat flavor profile. Maintaining a stable acidity and flavor profile of a coffee beverage can, therefore, be important in producing and maintaining a coffee beverage that is desired by consumers.

The task of maintaining the optimal acidity of a coffee beverage is not made any easier because it is believed that over 25 different acids exist naturally in roasted coffee and that many different factors can affect the final acidity of coffee. For instance, coffee may include chlorogenic, malic, citric, acetic, formic, glycolic, lactic and pyroglutamic acids as well as others. In addition, different bean varieties may also affect beverage acidity. For example, the pH of a coffee brewed from Arabica varieties generally has a pH between about 4.85 and about 5.15. Coffee brewed with Robusta beans, on the other hand, generally has a higher pH in the range of about 5.25 to about 5.40. Other processing factors can also affect the degree of acidity, such as, the degree of roast, the roast profile, the nature of the processing and the age of the green beans and the like.

Due to the length of commercial supply chains and the desired shelf life of liquid coffee beverages, a shortcoming exists with liquid coffee beverages. Liquid coffee beverages and extracts tend to be an unstable system, and both shelf- and refrigerator-stored liquid coffee products tend to naturally develop an increased acidity and varying flavor profile over a period of time generally due to naturally occurring acid-generating reactions in the beverage. Over time, these acid-generating reactions can slowly change the beverage's pH throughout a product's shelf file so that the beverage's acidity may also slowly change from the day it is produced to later in its shelf life. A rise in acidity or sourness of the beverage (lowering of pH) may translate into an inconsistent product and a loss of quality.

One attempted solution to prevent the sourness development in liquid coffee beverages over time is the addition of sodium bicarbonate to elevate the initial pH of the product. However, the pH of the sodium bicarbonate-treated liquid coffee product still falls over time as the naturally occurring acid generating reactions occur, which still results in a varying acidity profile throughout the product's shelf life. That is, the product immediately after manufacture may still have a different acidity profile from the product later in the shelf life. The sodium bicarbonate-treated coffee simply starts out with a higher pH that is reduced naturally over time as the reactions occur. However, such treated coffees would still tend to exhibit different acidity characteristics depending on when they are consumed in the product's shelf life. Moreover, the addition of the sodium bicarbonate may have additional potential repercussions on product flavor due to the inclusion of this additional ingredient to the beverage.

U.S. Pat. No. 6,054,162 describes another attempted solution to address the problem of liquid coffee sourness development. The '162 patent describes a method that inhibits the development of acidity by treating a coffee extract with an excessively large amount of alkali relative to the coffee solids to drive a reaction that converts any acid precursors in the beverage to their respective salts to inhibit the generation of acid. However, such method undesirably increases the pH of the coffee to unacceptably high levels with the excessive amounts of alkali (which is needed to drive the desired reactions) and, therefore, also requires neutralization of the treated coffee with an acid to neutralize the excess alkali into respective salts in order to adjust the final pH to the desired value. The excessive amounts of alkali over treat the coffee beverage, which can degrade the flavor and other desired organoleptic characteristics. Moreover, the excessive amounts of alkali require the additional neutralization steps, which add even more pH adjusting steps to the manufacturing process. The method described in the '162 patent requires between 0.1 mol/liter to 0.5 moles/liter of alkali to inhibit the acid generating reactions. On a solids basis, this is between 2 to 10 grams of alkali in an 8 percent coffee solids extract. Put another way, the method of the '162 patent requires 0.25 to 1.25 grams of alkali per percent of coffee solids in the extract.

Neither solution is particular desirable at producing a stable liquid coffee product. In the first case, when using sodium bicarbonate, the pH still varies upon storage resulting in an inconsistent product because it starts at an undesirably high level, which may still render an unacceptable high pH to the product if it is consumed early in its shelf-life. In the second case, with the excessive alkali and additional neutralization steps, the process tends to over treat the coffee (both due to excessive alkali and neutralization steps), require additional processing steps, and result in additional salts being formed in the beverage (end product of the neutralization) that can negatively effect taste and flavor profiles.

SUMMARY

A method for stabilizing liquid coffee concentrates is provided that forms a stabilized liquid coffee beverage, such as a concentrate, that has a substantially consistent acidity and flavor profile up to at least about 12 months of room temperature storage. In one aspect, the method first blends a liquid coffee concentrate base with an edible alkali source in an amount effective to artificially increase a pH of the liquid coffee concentrate base between about 0.5 to about 1.5 pH units to form a pH increased coffee concentrate. Next, an aromatic and/or coffee flavor is optionally added to the pH increased coffee concentrate. The pH increased coffee concentrate, with or without the flavor additive, is then aseptically processed and thermally treated at about 285 to about 295° F. for about 60 to about 180 seconds to artificially drive acid generating reactions in the concentrate to completion to form a stabilized liquid coffee concentrate. By one approach, the acid generating reactions are driven to completion as evidenced by a drop in pH of about 0.5 to about 1.5 pH units after thermal treatment. Optionally, the edible alkali source may also be added after thermal treatment.

By one approach, about 4 to about 5 grams of an edible alkali source per about 300 grams of coffee solids are blended to the concentrate base in order to artificially increase a pH of the liquid coffee concentrate base. By another approach, about 0.1 to about 0.16 grams of edible alkali source per percent of coffee solids is added to the liquid coffee concentrate base, which are both examples of amounts effective to artificially increase the pH the desired amounts.

The methods are effective to produce a stable liquid coffee concentrate that has desired organoleptic qualities of taste, flavor, and acidity that remain relatively consistent throughout the product's shelf life. As a result, no matter when the coffee is consumed throughout its shelf life, it will have substantially consistent organoleptic characteristics from the day it is made and for up to a year or more after manufacture because the acid and/or flavors that would normally be produced in the coffee over time are artificially produced in a very short amount of time. Thus, such acid and/or flavor profile is already present in the beverage when it is packaged.

In other aspects, the pH of the resultant stabilized liquid coffee concentrate remains between about 4.7 and about 5.3 and within a standard deviation of about 0.05 units or less between the day it is packaged and up to about 12 months or more of room temperature storage. Also, the resultant concentrates generally exhibit a titratable acidity to a pH of about 6.0 of about 1.6 to about 3.5 ml of 0.1 NaOH per 100 ml of concentrate and within a standard deviation of 0.3 or less between the day of packaging and up about 12 months or more of room temperature storage.

BRIEF DESCRIPTION OF THE DRAWINGS

FIG. 1 is a flowchart of an exemplary process.

DETAILED DESCRIPTION OF THE PREFERRED EMBODIMENTS

Disclosed are stabilized liquid coffee concentrates and methods of preparing stabilized liquid coffee concentrates that exhibit consistent organoleptic characteristics for an extended shelf-life by maintaining a substantially consistent acidity and/or flavor profile throughout the product's shelf life. In one aspect, the methods form a stabilized liquid coffee concentrate that has a relatively consistent pH and titratable acidity for at least about 12 months or more. The treated coffees herein generally exhibit a pH of about 5±0.3 from day one, immediately after being produced and packaged, and for up to about 12 months or more of room temperature storage. As a result, the desired organoleptic qualities of taste, flavor, and acidity remain relatively consistent throughout the product's shelf life. No matter when the coffee is consumed throughout its shelf life, it will have substantially consistent organoleptic characteristics from the day it is made and for up to a year or more after manufacture.

In another aspect, the methods not only form a coffee concentrate having a relatively consistent pH and titratable acidity, but at the same time substantially maintain the functionality of delicate coffee aromatics and flavor additives that may be blended with the concentrate to enhance the coffee flavor and aroma experience. The methods of the prior art to stabilize acidity of liquid coffee concentrates can be harsh on such aromatics and flavor additives, which tend to result larger amounts of the aromatics and additives in order to compensate for the loss during processing. The methods herein enable the use of lower amounts of aromatics and flavors because the methods are effective in retaining the functionality of these ingredients.

In general, a coffee product is first extracted with water to form a liquid coffee concentrate base or extract base. The coffee product may be a roast and ground coffee, a reconstituted coffee, an instant coffee, or the like. Next, the liquid coffee concentrate base is exposed to elevated temperatures for a time effective to drive acid generating reactions in the concentrate to substantial completion over a relatively short time as evidenced through a drop of the pH resulting from the formation of acids. The method also artificially increases the pH of the liquid coffee concentrate base in an amount related to the level of acid generating reactions by adding relatively small amounts of an edible alkali source, which compensates for the drop in pH due to the elevated temperature causing the formation of acids. The alkali can be added either prior to thermal treatment or after thermal treatment. Optionally, the methods also permit the use of delicate coffee aromatics and/or flavor additives, which are not destabilized from the thermal treatment or small alkali additions. After thermal treatment and pH adjustment, the resultant concentrate or stabilized liquid coffee concentrate is an acidity-stable, liquid-coffee concentrate that maintains a relatively consistent pH and titratable acidity from immediately after manufacture and for at least about 12 months or more of room temperature shelf storage.

As suggested by the above, it is believed that the stabilized liquid coffee concentrates made through the methods herein are able to maintain a relatively consistent acidity (as evidenced through pH and titratable acidity) because the increased temperature exposure of the concentrate during processing is effective to alter the reaction kinetics and, therefore, drive most if not all of the acid generating reactions to completion in a very short amount of time. As such, the resulting liquid coffee concentrate can exhibit a stable acidity profile throughout a 12 month or more shelf life because the reactions have already artificially been reduced to completion via a temperature driving force. Moreover, such stability is achieved without substantial use of preservatives, neutralizing agents, buffers, and the like. As will be described more below, the acid generating reactions are generally considered substantially complete upon the coffee experiencing a drop in pH of about 0.5 to about 1.5 units.

More particularly, it is generally believed that one of the major contributors to increased acidity in a stored coffee brew may be provided by the production of quinic acid, which, in some cases, can increase by almost 40 percent upon extended storage. Other acids which can also show significant increases in concentration throughout extended storage are believed to be acetic acid, glycolic acid, formic acid and phosphoric acid. Other acids, such as citric and malic acids may be relatively stable and show little to no significant increases over storage times. See, for example, U.S. Pat. No. 6,054,162, which is incorporated herein by reference. These acid concentration increases are believed to be the result of naturally occurring acid-generating reactions that proceed over time in the liquid coffee beverage during storage. It is believed that the methods herein artificially produce these acids in a very short amount of time due to the elevated temperatures.

While not wishing to be limited by theory, it is believed that the natural increases in quinic acid concentration on storage suggest that the natural hydrolysis of a quinic acid lactone may be a contributor to the slow acidity development of coffee. Similarly, it is also believed that the natural hydrolysis of the lactones to chlorogenic acid may, in some cases, represent about a 10 to about a 15 percent increase in the overall acidity of the coffee on storage. See again, for example, U.S. Pat. No. 6,054,162. The other acids which were found to naturally increase over time in liquid coffee beverages, such as acetic acid, formic acid, phosphoric acid and glycolic acid, are all low molecular weight acids which are believed to be slowly produced on storage by the natural hydrolysis of their precursor esters. As a result, while not wishing to be limited by theory, it is believed that the overall slow and natural acidity increase in a stored coffee extract or beverage can be primarily due to the formation of acids by the natural hydrolysis of esters and lactones present in the beverage from the roasting process. While not wishing to be limited by theory, it is believed that the methods herein drive these reactions to completion due to exposure to elevated temperatures in a relatively short amount of time (only a few seconds or minutes) rather than inhibiting the reactions or allowing such reactions to occur naturally during the product's lengthy shelf life.

To overcome this natural tendency of liquid coffee beverages to slowly develop acidity over time, the methods described herein do not mask the slow acidity increase or attempt to inhibit the reactions as in the prior methods. Rather, the methods actually encourage these reactions to occur quickly by forcing the acid generating reactions to completion through exposure to high temperatures in a short amount of time in conjunction with an artificial pH increase so that the forced reactions and alkali injection result in a drop of the pH to the desired pH ranges of the final product. Typically, for liquid coffee beverages, a pH from about 4.7 to about 5.3 and, more preferably, a pH of about 4.9 to about 5.1 are desired. Therefore, the methods herein first drive the acid reactions to completion and form acid and, also, artificially increase the pH by a set amount related to the level of acid generation so that when the acid generating reactions are quickly forced to completion, the final product pH is reduced by these reactions back down to the desired levels mentioned above. Since these acid generating reactions have already occurred by the time the product is packaged and ready for distribution, there is little to no reactive components remaining in the beverage to react over time. As a result, the acidity profile can remain relatively consistent through the product's shelf life. The methods herein are in contrast to the prior methods that still allow the reactions to occur naturally over time, but attempt to mask the pH drop with basic compounds, or the methods that attempt to inhibit the reactions from occurring, but run the risk that residual acid precursors remain that could still react and alter the acidity.

More specifically, preferred methods of making such stabilized liquid coffee concentrates are generally shown in FIG. 1. The methods involve first preparing a liquid coffee concentrate base or extract base by extracting a roast and ground coffee, a reconstituted coffee, an instant coffee or the like with an aqueous liquid and concentrating that aqueous liquid to a desired level. Then, the liquid coffee concentrate base is thermally treated at about 285° F. to about 290° F. for about 60 to about 180 seconds to artificially drive the naturally occurring acid generating reactions in the liquid coffee concentrate to completion to form a stabilized liquid coffee concentrate. By one approach, the endpoint of the acid generating reactions are evidenced by a drop in pH after thermal treatment of about 0.5 to about 1.5 pH units. The pH is increased, either before or after thermal treatment, by adding a small amount of an edible alkali source in an amount effective to increase the pH of the liquid coffee concentrate base, in most cases, between about 0.5 to about 1.5 pH units (preferably, about 0.5 to about 1.0 units) to form a pH increased coffee concentrate. Preferably, the amount of alkali is configured to increase the pH approximately the same amount as it dropped due to the acid generating reactions and, thus, its amount is related to the degree of acid generating reactions. The alkali can be added prior to or after thermal treatment. It is preferred to add the alkali prior to thermal treatment.

The resultant stabilized liquid coffee concentrate exhibits a desired acidity, as evidenced by pH and titratable acidity, that remains substantially consistent over about 12 months or more of room temperature storage. By one approach, the pH of the concentrate varies only about 0.6 units or less with a standard deviation of about 0.05 units or less over the 12 months of storage. That is, the pH remains within such narrow variability from the day it is produced for at least 12 months of storage. In comparison, untreated coffee experiences a drop in pH of about 1.5 or more units over 12 months of storage. In another approach, the titratable acidity of the liquid concentrate to a pH of about 6.0 or to a pH of about 8.1 only varies about 1 unit with a standard deviation of about 0.3 or about 1.3 units with a standard deviation of about 0.6, respectively.

Based on an aroma or GC analysis, the liquid concentrates treated by the methods herein demonstrate no statistical variation from immediately after treatment to at least about 26 weeks of ambient storage at about 90° F. The liquid concentrates herein also exhibit no statistical variation in the levels of furfuryl mercaptan between a sample immediately after treatment and a sample stored at about 90° F. for at least about 26 weeks. By one approach, for example, the variation in the level of furfuryl mercaptan between immediately after treatment (i.e., day 1) and 26 weeks of storage varies by about only 3 percent. While not wishing to be limited by theory, it is also believed that the levels of furfuryl mercaptan ($C_5H_6OS$) may be related to aroma and souring of the coffee over time. High levels of this compound can be undesired in a liquid coffee beverage.

Turning to more of the details, the starting liquid coffee concentrate base may be obtained as an extract of a roast and ground coffee, reconstituted coffee, or an instant coffee with hot water and, then, concentrated by evaporation or other concentration techniques to obtain the concentrated liquid coffee base. By one approach, a suitable liquid coffee concentrate base may have between about 5 and about 60 percent solids and, preferably, about 5 and about 55 percent solids, and most preferably, between about 30 percent and 55 percent solids. This liquid coffee concentrate base may be obtained from a process that uses lower temperatures to yield about 30 percent coffee extracts, such as a coffee extract obtained from a low yield extract process. Preferred starting concentrates generally have an initial pH ranging from about 4.7 to about 5.3.

The edible alkali source can be any food grade compound containing a source of hydroxide ions (OH). Preferably, the edible alkali sources are colorless, crystalline ionic compounds that tend to be soluble in water. Suitable edible alkali sources may include sodium hydroxide, calcium hydroxide, potassium hydroxide, and the like. Most preferably, sodium hydroxide is the desired edible alkali source because it does not impart any noticeable flavors or tastes to the coffee.

The amount of the alkali added to the liquid coffee concentrated base must be sufficient to artificially alter the pH to a level so that after the acid generating reactions are driven to completion, the combination of the generated acids and alkali addition targets the final pH of the concentrate at desired levels, such as 4.7 to about 5.3 and, more preferably, a pH of about 4.9 to about 5.1. Thus, the level of alkali addition is related to the degree of acid generating reactions, which results form the selected thermal treatment times and temperatures.

By one approach, about 0.5 to about 1.5 percent sodium hydroxide is added to a coffee concentrate base to artificially increase the pH about 0.5 to about 1 pH units, which is sufficient for the pH to be targeted to the desired levels during processing. By another approach, the amount of base will increase as the percent solids increases to provide a relative increase in pH. Preferably, the alkali source is diluted with water prior to being added to the concentrate, and blended with the concentrate at room temperature or, in some cases, at ambient or room temperature. By one approach, about 0.5 to about 0.6 percent (preferably 0.55 percent) alkali is added to the concentrate. By another approach, about 4 to about 5 grams alkali per about 30 percent coffee solids can be an effective amounts. For instance, about 4 to about 5 grams alkali per around 300 grams of coffee solids may be used, which is about 4 times less than required in the prior methods. By yet another approach, the method applies about 0.1 to about 0.16 grams (preferably, about 0.13 to about 0.16 grams) of alkali per percent of coffee solids.

Next, about 0.5 to about 0.8 percent volatile coffee flavor additive and, preferably about 0.55 percent of volatile coffee flavor additive is optionally added to the pH increased coffee concentrate. If desired, the coffee flavor may also be added prior to the base addition or even prior to thermal treatment. By one approach, the volatile coffee flavor may be a natural or artificial coffee flavor such as, for example, the coffee flavor as described in U.S. patent application Ser. No. 11/955,778, which is incorporated herein by reference.

After artificially raising the pH (which can also be done after thermal treatment) and optionally blending in the flavor additives, the concentrate is then thermally treated at elevated temperatures in order to drive the acid generating reactions to completion. The elevated temperatures are selected to drive the reactions to completion in short amount of time and, at the same time, maintain the functionality of the flavor additives, which can be easily evaporated or destroyed upon exposure to excessive temperatures or exposure times. By one approach, the pH increased coffee concentrate is exposed to elevated temperatures between about 285° F. to about 295° F. for a set amount of time sufficient to both drive the reactions to completion (lowering of pH about 0.5 to about 1.5 units) and at the same time maintaining the functionality of the flavor additives. After heating, then concentrate is processed through an aseptic system to a packaging line.

The concentrate may be exposed to a single or multi-stage heating configuration. By one approach, the concentrate is exposed to an aseptic heating coil at temperatures of about 293 to about 295° F. By another approach, the heating may be a first heater of about 179° F.; a second heater of about 285° F. to about 295° F., and a third heating stage of about 293° F. to about 295° F. Of course, other heating configurations may also be used. In general, temperatures above these ranges tend to flash off or destroy the functionality of the flavor and generally tend to degrade the flavor of the coffee. Temperatures below this range are not practical because they require longer processing equipment and longer processing times.

After heating, the concentrate is cooled preferably to room temperature in a single or multi-state cooling configuration. By one approach, the thermally treated concentrate is cooled with a first stage to about 180° F. and a second stage to about room temperature. However, other cooling configurations may also be used.

After cooling, the product may be packaged using an aseptic packing line in any configuration of product packaging. By one approach, the concentrate may first be sent to an aseptic surge tank, packaged in appropriate containers, and sealed for storage. FIG. 1 provides an exemplary flow diagram of one process for producing such stabilized liquid coffee concentrate.

It has been discovered that the exposure of the concentrated beverages to elevated temperatures reduces and, preferably, minimizes the acidity development of the resultant beverage over time; however, the exposure time at the elevated temperatures must be carefully selected in a desired range in order to sufficiently increase the reaction kinetics without destroying the functionality of the flavor and aroma additives. By one approach, exposure times at the elevated temperatures are at least about 60 seconds and less than about 180 seconds. These exposure times are selected to sufficiently drive the reactions to completion in a short amount of time, but at the same time to also preserve the functionality of the flavor additives and to preserve the organoleptic characteristics of the base coffee material. Along these lines, it has generally been discovered that exposure times less than about 60 seconds do not sufficiently drive these acid reactions to completion, which results in a concentrate that can still develop acidity over time through changes in pH due to additional acid generating reactions that occur over time. Exposure times greater than about 180 seconds, on the other hand, can be detrimental to the functionality of the coffee aromas and flavors added to the beverage and can tend to form a flat beverage. As a result, the resultant stabilized liquid coffee concentrate preferably has most if not all of the acid generating reactions driven to completion prior to the concentrate being packaged and shipped to the store shelf.

Advantages and embodiments of the methods described herein are further illustrated by the following examples; however, the particular conditions, processing schemes, materials, and amounts thereof recited in these examples, as well as other conditions and details, should not be construed to unduly limit this method. All percentages are by weight unless otherwise indicated.

EXAMPLES

Example 1

A liquid coffee concentrate base was aseptically processed to drive acid generating reactions to completion. A liquid coffee concentrate (Colombo Extract, Café Pele, Cacique, Brazil) having about 29.8 percent solids made from about 50 percent Arabica and about 50 percent Robusta beans was processed according to the methods described herein. First, sodium hydroxide was added to increase the pH either 0.5 or 1.0 pH units as provided in the Table 1 below. Next, about 0.55 percent of a volatile coffee flavor was added (GV Creative Flavors). The resultant blend was processed at the times and temperatures of Table 1 to drive the reactions to completion as evidence by the final pH measurement.

The concentrate, sodium hydroxide, and flavor were mixed under normal low shear agitation and then aseptically processed using a first stage heater at about 179° F., a second stage heater at about 292° F., and then held at the process temperature and times of the table below using aseptic coils. The aseptically treated concentrate was then cooled using a two stage cooler (about 180° F. and about 77° F.) prior to aseptic packaging. The cooled concentrated was then directed to an aseptic surge tank and packaged in 1 gallon bag-in-box samples.

TABLE 1

| No. | Initial pH | Conc., lbs | pH after NaOH add | pH Increase | Flavor, lbs | pH with Flavor | Process Temp, °F. | Flowrate, gpm | Time, sec | pH Final | pH Drop |
|---|---|---|---|---|---|---|---|---|---|---|---|
| 1 | 5.2 | 2127 | 5.7 | 0.5 | 11.7 | 5.78 | 293 | 10 | 90 | 5.2 | 0.58 |
| 2 | 5.2 | 2257 | 5.7 | 0.5 | 12.4 | 5.76 | 293 | 14 | 60 | 5.2 | 0.56 |
| 3 | 5.2 | 2046 | 6.2 | 1.0 | 11.3 | 6.15 | 291 | 14 | 60 | 5.6 | 0.55 |
| 4 | 5.2 | 2145 | 6.2 | 1.0 | 11.8 | 6.25 | 290 | 10 | 90 | 5.7 | 0.55 |
| 5 | 5.2 | 2835 | 6.2 | 1.0 | 15.5 | 6.27 | 290 | 10 | 180 | 5.4 | 0.87 |

The starting pH of the samples (before sodium hydroxide addition) was about 5.2 in each case, while the final pH after thermal treatment was about 5.2 to about 5.7, which demonstrates that the artificial increase of pH effectively resulted in a treated concentrate having a similar pH as that prior to the processing.

Example 2

Samples numbers 2 and 3 from Example 1 were also evaluated for acidity development for up to 16 weeks of storage at about 90° F., which is an accelerated test to estimate room temperature storage for about 16 months. These samples were compared to control concentrates of samples 2 and 3, which were each stored at −20° F., which retards the acid generating reactions. Samples were periodically tested for pH and titratable acidity to determine changes in the acidity development of the concentrates over time. Results are provided in Tables 2 through 4 below and compared to an untreated control that was held at −20° F. throughout the test to retard any acid generating reactions. The untreated control represents a liquid coffee sample at the beginning of its shelf life because it was held at temperatures throughout the study that retard any acid generating reactions.

TABLE 2 pH and Titratable Acidity of Sample No. 2 of Example 1

| | Control stored at −20° F. | | | 90° F. Storage | | |
|---|---|---|---|---|---|---|
| Weeks Storage | pH | TA @ 6.0 (mL 0.1 NaOH per 100 mL) | TA @ 8.1 (mL 0.1 NaOH per 100 mL) | pH | TA @ 6.0 (mL 0.1 NaOH per 100 mL) | TA @ 8.1 (mL 0.1 NaOH per 100 mL) |
| 0 | 5.10 | 2.18 | 5.76 | — | — | — |
| 1 | 4.99 | 2.65 | 6.78 | 4.93 | 2.91 | 7.03 |
| 2 | 5.03 | 2.26 | 5.83 | 5.01 | 2.52 | 6.07 |
| 3 | 5.01 | 2.15 | 5.42 | 4.97 | 2.46 | 5.71 |
| 4 | 5.03 | 2.16 | 5.59 | 4.97 | 2.92 | 6.81 |
| 6 | 5.00 | 2.04 | 5.95 | 4.93 | 3.08 | 6.49 |
| 7 | 5.02 | 2.86 | 6.29 | 4.94 | 3.16 | 6.56 |
| 8 | 5.01 | 2.91 | 6.42 | 4.90 | 3.26 | 6.70 |
| 9 | 4.98 | 3.06 | 6.70 | 4.92 | 3.34 | 6.89 |
| 11 | 4.99 | 3.00 | 6.64 | 4.89 | 3.48 | 7.13 |
| 12 | 4.98 | 2.59 | 6.39 | 4.87 | 3.02 | 6.64 |
| AVG | 5.00 | 2.57 | 6.20 | 4.93 | 3.02 | 6.60 |
| STDEV | 0.02 | 0.39 | 0.48 | 0.04 | 0.33 | 0.43 |
| MAX | 5.03 | 3.06 | 6.78 | 5.01 | 3.48 | 7.13 |
| MIN | 4.98 | 2.04 | 5.42 | 4.87 | 2.46 | 5.71 |

TABLE 3 pH and Titratable Acidity of Sample No. 3 of Example 1

| | Control at −20° F. | | | 90° F. Storage | | |
|---|---|---|---|---|---|---|
| Weeks Storage | pH | TA @ 6.0 (mL 0.1 NaOH per 100 mL) | TA @ 8.1 (mL 0.1 NaOH per 100 mL) | pH | TA @ 6.0 (mL 0.1 NaOH per 100 mL) | TA @ 8.1 (mL 0.1 NaOH per 100 mL) |
| 0 | 5.38 | 1.32 | 4.80 | — | — | — |
| 1 | 5.25 | 1.44 | 4.84 | 5.17 | 1.82 | 5.55 |
| 2 | 5.38 | 1.38 | 4.84 | 5.26 | 1.60 | 4.94 |
| 4 | 5.35 | 1.29 | 4.62 | 5.23 | 1.72 | 5.02 |
| 6 | 5.35 | 1.26 | 4.91 | 5.16 | 1.88 | 5.58 |
| 7 | 5.37 | 1.27 | 5.06 | 5.15 | 1.90 | 5.59 |
| 8 | 5.33 | 1.34 | 5.23 | 5.13 | 1.98 | 5.78 |
| 9 | 5.34 | 1.11 | 4.56 | 5.13 | 1.96 | 5.76 |
| 11 | 5.33 | 1.27 | 5.08 | 5.12 | 2.57 | 6.14 |
| 12 | 5.34 | 1.37 | 5.04 | 5.09 | 2.12 | 5.66 |
| AVG | 5.34 | 1.30 | 4.91 | 5.16 | 1.95 | 5.56 |
| STDEV | 0.04 | 0.09 | 0.22 | 0.05 | 0.28 | 0.37 |
| MAX | 5.38 | 1.44 | 5.23 | 5.26 | 2.57 | 6.14 |
| MIN | 5.25 | 1.11 | 4.56 | 5.09 | 1.6 | 4.94 |

TABLE 4 pH and Titratable Acidity of a duplicate of Sample No. 2 from Example 1

| | Control at −20° F. | | | 90° F. Storage | | |
|---|---|---|---|---|---|---|
| Weeks Storage | pH | TA @ 6.1 (mL 0.1 NaOH per 100 mL) | TA @ 8.2 (mL 0.1 NaOH per 100 mL) | pH | TA @ 6.1 (mL 0.1 NaOH per 100 mL) | TA @ 8.2 (mL 0.1 NaOH per 100 mL) |
| 0 | — | — | — | 4.96 | 2.76 | 8.58 |
| 5 | 4.87 | 2.60 | 7.21 | 4.88 | 2.83 | 7.58 |
| 7 | 4.89 | 2.55 | 7.27 | 4.87 | 2.99 | 7.81 |
| 11 | 4.89 | 2.90 | 7.90 | 4.83 | 3.25 | 8.20 |
| 15 | 4.87 | 2.70 | 8.05 | 4.77 | 3.48 | 8.92 |
| 23 | 4.83 | 3.09 | 8.74 | 4.77 | 3.52 | 9.25 |
| AVG | 4.87 | 2.77 | 7.83 | 4.82 | 3.21 | 8.35 |
| STDEV | 0.01 | 0.15 | 0.43 | 0.05 | 0.29 | 0.59 |
| MAX | 4.89 | 2.9 | 8.05 | 4.88 | 3.48 | 8.92 |
| MIN | 4.87 | 2.55 | 7.21 | 4.77 | 2.83 | 7.58 |

As can be seen by comparing the pH and titratable acidity (TA) of the inventive and control data in Tables 2, 3, and 4, the pH and TA of the inventive samples demonstrated a similar acidity profile based on pH and TA as compared to the unprocessed control that was held at −20° F. to retard any acid generating reactions. Thus, the data demonstrates that the inventive samples after 12 to 26 weeks of storage at 90° F. exhibited an acidity profile as evidenced by pH and TA consistent with a sample at the beginning of its shelf life.

Example 3

An analytical sensory analysis was completed to determine the differences between untreated extract at the beginning of its shelf life, inventive sample number 2 of Example 1 obtained immediately after treatment, and inventive sample number 2 of Example 1 obtained 26 weeks after storage at 90° F. Each liquid coffee sample was subjected to a liquid/liquid extraction to identify individual aroma components, which were then stripped via a solvent and subjected to a standard GC analysis to identify the component and relative amounts thereof. Results of the analysis are provided in Table 5 below. The untreated sample was held at −20° F. to retard any degradation or reactions that may occur.

TABLE 5

Results of Total Liquid/Liquid Extraction and GC Analysis

| Sample ID | Total Average Aroma Counts, μg/Kg | % Variation | Fit Value |
|---|---|---|---|
| Untreated Control | 547,993 | 5 | 84 |
| Inventive Sample #2 immediately after treatment | 565,930 | 3 | 91 |
| Inventive Sample #2 after 26 weeks storage | 515,289 | 4 | 52 |

The data provides the average of two readings in μg/Kg of sample, the variation of the readings, and the fit valves. Fit valve of 120 or less indicate no statistical difference. Thus, the data demonstrates there is no statistical difference between the untreated sample at the beginning of its self life, the treated sample obtained immediately after treatment, and the treated sample after 26 weeks of storage.

In addition, as shown in Table 6, the analysis also identified the compound furfuryl mercaptan ($C_5H_6OS$) in each of the samples, which is also believed to be related to aroma and souring of the coffee over time. As shown in Table 6 below, there is also no statistical difference (i.e., fit valve less than 120) between the amounts of this particular compound between the control and treated samples.

TABLE 6

Furfurylmercaptan in Samples

| Sample ID | Average Aroma Counts of furfuryl mercaptan, μg/Kg | % Variation | Fit Value |
|---|---|---|---|
| Untreated Control | 35,947 | 5 | 56 |
| Inventive sample #2 immediately after treatment | 36,203 | 3 | 13 |
| Inventive sample #2 after 26 weeks storage | 35,840 | 0 | 0 |

It will be understood that various changes in the details, materials, and arrangements of the process, formulations, and ingredients thereof, which have been herein described and illustrated in order to explain the nature of the method and resulting concentrates may be made by those skilled in the art within the principle and scope of the embodied method as expressed in the appended claims.

What is claimed is:

1. A method of forming a stabilized liquid coffee concentrate, the method comprising:
   providing a liquid coffee concentrate base having about 5 to about 60 percent coffee solids, a pH of about 4.7 to about 5.3, and aroma compounds including furfuryl mercaptan;
   thermally treating the liquid coffee concentrate base at about 285 to about 295° F. for about 60 to about 180 seconds to artificially drive acid generating reactions in the concentrate base to completion as evidenced by a drop in pH of about 0.5 to about 1.5 pH units after thermal treatment while maintaining the aroma components and furfuryl mercaptan in the liquid coffee concentrate base during and after thermal treatment;
   blending an effective amount of an edible alkali source to the concentrate base in order to artificially increase the pH of the liquid coffee concentrate base between about 0.5 to about 1.5 pH units to form a stabilized liquid coffee concentrate, wherein the blending occurs before or after the thermal treatment; and
   wherein the thermal treatment and blending steps are effective such that the pH of the stabilized liquid coffee concentrate exhibits a pH between about 4.7 and about 5.3 after the combination of the thermal treatment and blending steps and also after at least about 12 months of room temperature storage; and
   the thermal treatment and blending are effective so that a variation in a level of furfuryl mercaptan from the liquid coffee concentrate base is maintained after about 26 weeks of storage at 90° F. within about 3% of the level of furfuryl mercaptan immediately after thermal treatment.

2. The method of claim 1, wherein the pH of the stabilized liquid coffee concentrate remains between about 4.7 and about 5.3 within a standard deviation of about 0.05 units or less after the thermal treatment and blending steps and also after at least about 12 months of room temperature storage.

3. The method of claim 1, wherein a titratable acidity of the stabilized liquid coffee concentrate to a pH of about 6.0 remains within about 1.6 to about 3.5 mL of 0.1 NaOH per 100mL concentrate within a standard deviation of 0.3 or less after the thermal treatment and blending steps and also after at least about 12 months of room temperature storage.

4. The method of claim 1, wherein the liquid coffee concentrate base has a percent solids of about 30 to about 55 percent.

5. The method of claim 1, wherein the edible alkali source is selected from the group consisting of sodium hydroxide, calcium hydroxide, potassium hydroxide, and mixtures thereof.

6. The method of claim 5, wherein the edible alkali source is sodium hydroxide.

7. The method of claim 1, wherein about 4 to about 5 grams of the edible alkali source per about 300 grams of coffee solids is added to the liquid coffee concentrate base.

8. The method of claim 1, wherein the blend occurs before the thermal treatment.

9. The method of claim 1, wherein about 0.5 to about 0.8 percent of a liquid coffee flavor is added before the thermal treatment.

* * * * *